United States Patent [19]

Caudill, Jr.

[11] Patent Number: 4,541,885
[45] Date of Patent: Sep. 17, 1985

[54] METHOD OF MANUFACTURING A VEHICLE SEAT COVER

[75] Inventor: Charles Caudill, Jr., Warren, Mich.

[73] Assignee: General Motors Corporation, Detroit, Mich.

[21] Appl. No.: 664,933

[22] Filed: Oct. 25, 1984

Related U.S. Application Data

[63] Continuation of Ser. No. 503,245, Jun. 10, 1983, abandoned.

[51] Int. Cl.$^4$ .................. B32B 5/18; B29C 27/04; B29D 27/00; B29G 7/02
[52] U.S. Cl. .................. 156/220; 156/222; 156/223; 156/245; 156/274.4; 156/275.1; 156/290; 264/26; 264/321; 428/160; 428/316.6
[58] Field of Search .................. 156/196, 220-223, 156/245, 274.4, 274.8, 275.1, 290, 309.6, 331.7; 264/26, 321, DIG. 17; 428/160, 172, 316.6; 297/DIG. 1, DIG. 2; 521/75, 137

[56] References Cited

U.S. PATENT DOCUMENTS

| | | | |
|---|---|---|---|
| 3,244,571 | 4/1966 | Weisman | 156/196 |
| 3,306,967 | 2/1967 | Turkewitsch | 264/321 |
| 3,632,533 | 1/1972 | Winkler | 521/75 |
| 4,022,856 | 5/1977 | Maxey | 156/274.4 X |
| 4,302,272 | 11/1981 | Phillips et al. | 156/78 X |
| 4,313,776 | 2/1982 | Urai et al. | 156/220 |

*Primary Examiner*—Edward C. Kimlin
*Assistant Examiner*—Ramon R. Hoch
*Attorney, Agent, or Firm*—George A. Grove

[57] ABSTRACT

In accordance with a preferred embodiment, a dielectrically embossed automotive seat cover assembly is formed by providing a laminate of a decorative cover material, a first, relatively thin, polyurethane foam layer that is dielectrically heatable and a second thicker polyurethane foam layer that is not dielectrically heatable, and thereafter impressing a desired embossment pattern into the upper polyurethane and dielectrically fusing said upper layer of polyurethane to bond the cover layer to the lower polyurethane layer, thus forming the embossed pattern in the laminate structure.

3 Claims, 2 Drawing Figures

METHOD OF MANUFACTURING A VEHICLE SEAT COVER

This is a continuation of application Ser. No. 503,245 filed on June 10, 1983 now abandoned.

This invention relates to a method of making decorative seat cover assemblies, such as might be used in automotive vehicle seats. More particularly, this invention relates to an improved method of making a dielectrically embossed seat cover assembly.

BACKGROUND

Automotive seats have been made of supported and covered open cell polyurethane foam cushions. The molded cushion is supported by a suitable frame which may include wire or other support portions underlying the foam or embedded in it. Two or more different foams may be used to provide the cushion(s) with regions of different stiffness or hardness for seating comfort. The seating surface and sides of the cushion are covered with a decorative, usually colored material. The cover material, for example, may be a vinyl sheet leather or a woven or knit cloth fabric. The cover material is usually attached to the foam bun and/or to the frame by suitable connectors such as hog rings, hooks and loops or other mechanical fasteners. In some automobile seats a multilayer seat cover assembly, including a relatively thin foam layer, is used to cover the seat cushions. As will become apparent the multilayer cover makes it easier to provide decorative or functional lifts or contours in the seating surface or back surface of the seat. Generally, these assemblies comprise at least three layers. Typically, a relatively thin cloth layer (e.g. a scrim material) serves as a base layer. An intermediate layer is a thin (up to about ½ inch), flexible, polyurethane foam pad. The outer layer is a decorative cover of, for example, vinyl sheet or a suitable fabric. The three layers are usually sewn together by adhesive material.

Sometimes it is desired to form decorative or functional contours, or lifts, or embossments in the visible surface of these laminated cover assemblies or pads. One way to do this is to laboriously press down and stitch the cover layer to the base layer. Often a more efficient way would be by die bonding or by dielectric embossing.

In dielectric embossing a two-platen press is used with a suitable die(s) to form the desired pattern of indentations (embossments) into the cover surface of the seat cover assembly. Under each die edge the foam is essentially fully compressed and the cover layer brought close to the base layer. A very high frequency (typically radio frequency) electromagnetic field is applied between the platens to the workpiece. Any material in the workpiece that is responsive to the high frequency field will be quickly heated. In this case the goal is to heat and fuse the polyurethane foam compressed under the die edges and between the cover layer and substrate. Upon solidification, the fused foam bonds the cover layer to the substrate, retaining the desired embossed pattern in the trim member.

Conventional polyurethane foam slab stock is not readily heated dielectrically. It is not a dielectrically "lossy" material. However, polyurethane foam compositions have been formulated or prepared which can be dielectrically heated and such materials have been used in relatively thin, dielectrically embossed, laminated seat cover assemblies. However, the embossed polyurethane seams are quite stiff if they include much fused foam. Such stiffness is undesirable in automotive seats. Furthermore, if the foam layer is very thick, the embossed structure is distorted. Heretofore, the urethane foam dielectric embossing technology has not permitted the decorative embossing of a relatively thick, urethane foam layer such as may be required or desired in a seat cover assembly.

Accordingly, it is an object of the present invention to provide a method of making decorative, dielectrically embossed, urethane foam seat cover assemblies where the embossed pattern can be formed without regard to the overall thickness requirements of the foam layer of the assembly.

BRIEF SUMMARY

In accordance with the preferred embodiment of my invention, this and other objects and advantages are accomplished by starting with a two-layer polyurethane foam block. One of the polyurethane foam layers is of a composition that can be dielectrically heated. The other layer is ordinary polyurethane foam slab stock that is unresponsive to dielectric heating. Two layers are bonded together. The thickness of the dielectrically heatable layer is dictated by the desired embossing pattern to be formed in the cushion. The overall thickness of the two layers is determined by the required foam thickness of the seat cover assembly.

A cover layer is applied over the two-layer foam laminate such that it overlies the dielectrically heatable layer. The cover fabric may comprise one or more layers of suitable decorative material. It may, for example, be vinyl sheeting. It may be a woven or knitted fabric of nylon, polyester or other suitable fibers. There may be an intermediate mat layer under the cover material. There may also be an adhesive layer serving to bond the cover material to the composite polyurethane foam body. A suitable base layer, such as a cloth layer, may be bonded to the bottom of the composite foam body.

A desired pattern of embossments or indentations may now be formed dielectrically in the seating surface of the cover assembly. The workpiece is placed between the platens of a dielectric press and the die blades, configured in the desired pattern, brought into contact with the cover layer. Depressions are formed in the surface approximating the thickness of the dielectrically heatable, polyurethane foam layer. When the high frequency electromagnetic field is applied, the upper layer only of polyurethane foam beneath the depressed cover layer is fused, bonding the cover layer to the lower, unheated layer of polyurethane foam. While the two distinct foam layers of the laminate cooperate to form a very useful seat cover assembly of pleasing appearance, the thickness of the respective layers can be independently controlled to obtain both an attractive dielectrically embossed pattern and a functionally useful seat cover. In this way a visually pleasing, functional or decorative contour can be formed in the upper part of the seat cover without regard to the overall thickness of the foam.

It will be appreciated that the cover layer does not have to be present during the embossing of the two-layer polyurethane foam laminate. A sheet of suitable cover material could be adhesively bonded to the contoured surface of a dielectrically embossed foam laminate. However, where it is desired to form an imitation stitching pattern or other intricate pattern in the cover layer, it should be on the foam laminate when the embossing is done.

DESCRIPTION OF THE DRAWINGS

Further objects and advantages of my invention will be better understood from a detailed description thereof which follows. Reference will be made to the drawing, in which.

DETAILED DESCRIPTION

Figure 1:
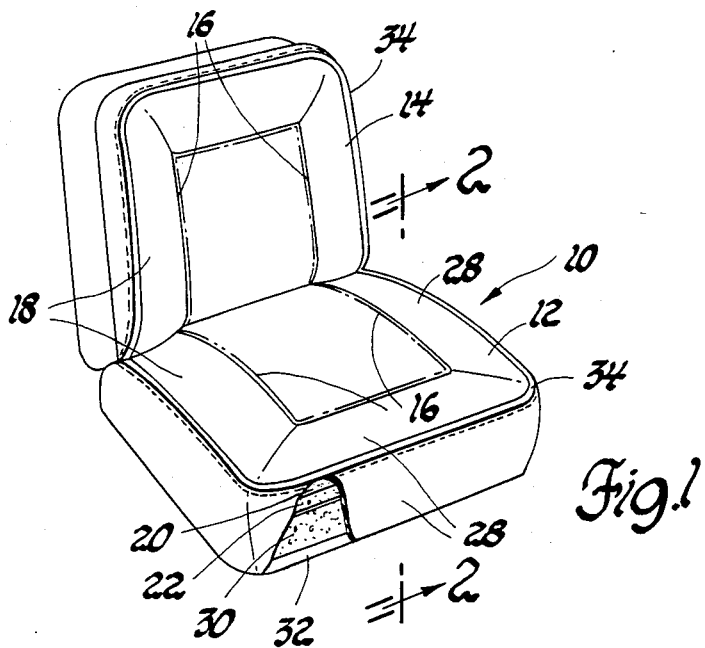
FIG. 1 is a perspective view of an automotive seat with a seating cushion and back cushion and having contoured seat cover assemblies prepared in accordance with this invention.

In FIG. 1 is illustrated an assembled automotive seat 10. The seat includes seat portion 12 and a back portion 14. It is observed that both seat and back portions have a pattern of embossed depression lines 16 that result in contoured or lifted up portions 18.

Each portion has at least one foam cushion 30 and suitable metal or molded plastic reinforcing or frame member 32. In FIG. 1, these parts are seen only in the broken away portion because the seat assembly is enclosed by a suitable cover material 28. Cover material 28 is part of a seat cover assembly described below. My invention deals with a method of forming a decorative, dielectrically embossed pattern in such seat cover assembly.

Figure 2:
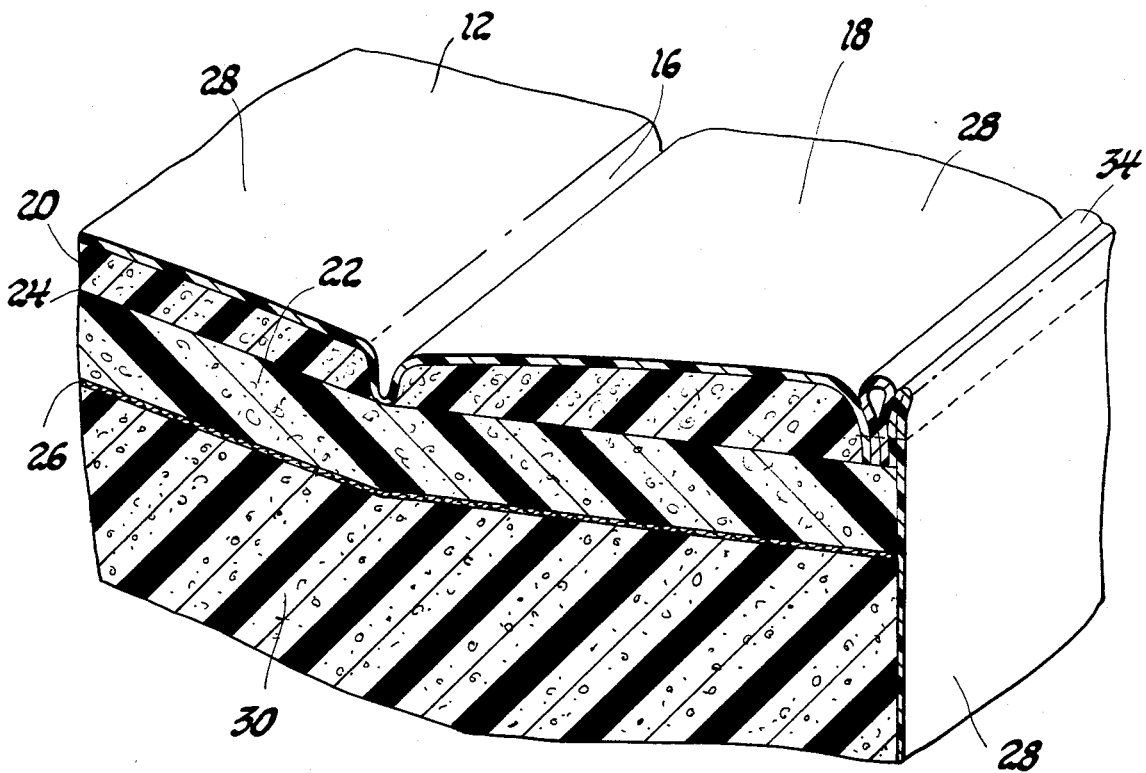
FIG. 2 is an enlarged, broken away, sectional view taken along plane 2—2 of FIG. 1 showing how the subject method makes use of the two polyurethane foam layers in the cushion pad.

FIG. 2 is a broken off cross-section along line 2—2 of FIG. 1 of a seat having a seat cover assembly formed in accordance with my method. The assembly includes a two-layer, polyurethane foam body, with upper layer 20 and lower layer 22. The foam layers are bonded together at their interface 24 by means of a suitable adhesive. Upper polyurethane layer 20 is the layer in which the embossment pattern will be formed and the composition of this foam must be such that it is responsive to dielectric heating. Such polyurethane foam compositions are known and readily commercially available. This aspect of layer 20 will be discussed in more detail below.

Lower polyurethane foam layer 22 is a conventional urethane foam slab stock material. It is not responsive to dielectric heating, i.e., it will not readily heat up when exposed to high frequency electromagnetic radiation. Foam layers 20 and 22 are bonded together at their interface 24 by any suitable adhesive.

Underneath foam layer 22 is a suitable base layer 26 which may be a scrim cloth or other cloth sheeting or even a plastic sheeting. The specific composition or even the presence of sheeting 26 is not a critical part of my method.

Overlying the dual foam layers, and particularly covering upper foam layer 20, is a decorative cover layer 28. This cover layer 28 extends down past the dual foam layers and may enclose any seat cushion 30 and frame member 32. It is usually fastened to the frame by suitable means. Cover 28 may be a vinyl sheet material. It may be a suitable fabric formed of woven or knitted fibers. It will have the durability and decorative characteristics desired in the seating application intended. This cover layer may actually comprise several layers. Underlying the cloth or sheet layer may be a webbing or mat layer (for breathability or other purposes), and underlying the webbing layer may be an adhesive layer that bonds the cover layer to urethane foam layer 20. The precise composition or form of the cover layer is likewise not critical to the practice of this invention so long as it is compatible with the underlying polyurethane foam and the rest of the seat construction. The figures of the drawing also show a decorative welt 34 sewn into the cover material 28 at the edge of the seat. The inclusion of this welt is not part of my invention. However the cover 28 and the dual polyurethane foam laminate 20 and 22 form a seat cover assembly that may be produced by this method and used in automobile seat constructions.

As previously stated, urethane foam materials in slab form are commercially available which can be dielectrically heated. The thermosetting polyurethane foam must be altered to contain a thermoplastic constituent that is heatable by dielectric heating methods. For example, the polyurethane foam may be altered to mechanically incorporate a thermoplastic resin in particulate form, such as plasticized polyvinyl chloride, polymethylmethacrylate, polystyrene, polyethylene or the like. Another approach to preparing dielectrically heatable polyurethane foams is to chemically graft a block thermoplastic polymer segment into or onto the polyurethane chain. Such a thermoplastic block might be, by way of example, a polystyrene acrylonitrile block. Either way, mechanically or chemically, a dielectrically lossy, thermoplastic constituent is incorporated into the polyurethane foam body layer that is to constitute the top layer of the dual polyurethane foam laminate used in my process for the cover assembly.

It will be realized, as I further describe the practice of my invention, that the thickness of the upper polyurethane foam layer 20 will largely be determined by the depth of the indentations 16 to be formed in the cover assembly (20, 22, 28). Foam thickness up to one half inch can be embossed without introducing undue indentations, seam stiffness, or distorting the cover assembly. On the other hand, the thickness of the nondielectrically heatable polyurethane foam layer 22 may be specified to fit other requirements, such as structural needs, of the cover assembly.

Thus, my laminate of heatable polyurethane foam layer 20 and nondielectrically heatable foam layer 22 can now be dielectrically embossed as follows. The laminate workpiece, with or without an overlying cover material 28, is placed between the platen of a dielectric embossing press. One of the platens will have affixed thereto a die strip arrangement that will exert pressure on the upper surface of the workpiece to form the desired indentation pattern. The die edge will come down and form indentations 16 as illustrated in FIG. 2 by compressing foam layer 20 so that cover layer 28 (if present) is closely adjacent foam layer 22. As the dielectric press applies the high frequency energy, layer 20 is selectively heated particularly in the densified regions underlying the die members so that the compressed foam in such region fuses and bonds cover layer 28 to foam layer 22. In accordance with prior art practices it would have been necessary to depress the cover layer 28 completely through the combined foam layers until the cover layer was in contact with base layer 26. My method avoids this by using a dual (dielectrically heatable—nondielectrically heatable layer) foam cushion pad.

If the cover material 28 is present during the dielectric embossing operation the indented portions are bonded as described to the lower foam layer 24. If the cover is not present when the upper foam layer 20 is embossed it can later be adhesively bonded to the foam layer 20 to complete the cover assembly.

It will be appreciated that the practice of my invention can take various forms. The decorative polyurethane cushion formed by my method may constitute an entire seat cushion or only a trimmed cover layer assembly thereof. It will also be appreciated that the lower structural polyurethane foam layer may itself include different polyurethane foam materials having different hardnesses or stiffness as may be desired to form a suitable seat. Thus, while my invention has been described in terms of a preferred embodiment thereof, it will be appreciated that other forms may readily be adapted and the scope of my invention is to be considered only by the following claims.

The embodiments of the invention in which an exclusive property or privilege is claimed are defined as follows:

1. A method of making an embossed, covered, polyurethane foam cushion comprising forming a laminate comprising two polyurethane foam layers bonded to each other, the first of said layers being composed so as to be dielectrically heatable to a fusion temperature for embossing and the second of said foam layers being composed so as to not be fused by such dielectric heating, bonding a layer of covering material to said laminate overlying said first foam layer, and pressing an embossed pattern into said cover layer and the first polyurethane layer while dielectrically heating said first layer to fuse it and bond the depressed portion of the cover layer in the desired embossment pattern to the second foam layer without fusing and embossing the second foam layer, the initial thickness of said first layer being suitable to form the desired embossment, and the overall thickness of the two foam layers being sufficient to provide a desired cushion.

2. A method of making an embossed, covered, polyurethane foam cushion comprising forming a laminate comprising two polyurethane foam layers bonded to each other, the first of said layers being composed so as to be dielectrically heatable to a fusion temperature for embossing and the second of said foam layers being composed so as to not be fused by such dielectric heating, pressing an embossed pattern into said first polyurethane layer while dielectrically heating said first layer to fuse it and bond the depressed portion thereof in the desired embossment pattern to the second foam layer without fusing and embossing the second foam layer, the initial thickness of said first layer being suitable to form the desired embossment, and the overall thickness of the two foam layers being sufficient to provide a desired cushion, and thereafter bonding a cover material to the embossed surface of said laminate.

3. A method of making an embossed, covered, polyurethane foam automotive seat cover assembly, comprising forming a laminate comprising two polyurethane foam layers bonded to each other, the first of said layers being composed so as to be dielectrically heatable to a fusion temperature for embossing and the second of said foam layers being composed so as to not be fused by such dielectric heating, bonding a layer of covering material to said laminate overlying said first foam layer, and extending beyond said foam layer as necessary to trim an automotive seat, and pressing an embossed pattern into said cover layer and the first polyurethane layer while dielectrically heating said first layer to fuse it and bond the depressed portion of the cover layer in the desired embossment pattern to the second foam layer without fusing and embossing the second foam layer, the initial thickness of said first layer being suitable to form the desired embossment, and the overall thickness of the two foam layers being sufficient to provide a desired cover assembly.

* * * * *